United States Patent [19]

Nakano

[11] Patent Number: 5,027,669
[45] Date of Patent: Jul. 2, 1991

[54] DUAL TOROIDAL CAVITY TYPE CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 450,326

[22] Filed: Dec. 14, 1989

[30] Foreign Application Priority Data

Dec. 16, 1988 [JP] Japan .................. 63-318106

[51] Int. Cl.⁵ .......................................... F16H 15/26
[52] U.S. Cl. ........................................ 74/200; 74/190; 74/199
[58] Field of Search ......................... 74/190, 199, 200

[56] References Cited

U.S. PATENT DOCUMENTS

| | | | |
|---|---|---|---|
| 2,030,203 | 2/1936 | Gove et al. | 74/200 |
| 2,045,558 | 6/1936 | Almen et al. | 74/200 |
| 4,159,653 | 7/1979 | Koivunen | 74/200 |
| 4,386,536 | 6/1983 | Kraus | 74/200 |
| 4,434,675 | 3/1984 | Kraus | 74/200 |
| 4,909,092 | 3/1990 | Machida et al. | 74/200 |

FOREIGN PATENT DOCUMENTS

| | | | |
|---|---|---|---|
| 581107 | 7/1933 | Fed. Rep. of Germany | 74/200 |
| 2733764 | 2/1978 | Fed. Rep. of Germany | 74/200 |
| 1275997 | 12/1960 | France | 74/199 |
| 62-258255 | 11/1987 | Japan . | |
| 63-125852 | 5/1988 | Japan . | |
| 63-92859 | 6/1988 | Japan . | |
| 431199 | 6/1935 | United Kingdom . | |
| 435893 | 10/1935 | United Kingdom | 74/200 |
| 2018894 | 10/1979 | United Kingdom | 74/200 |

Primary Examiner—Allan D. Herrmann
Assistant Examiner—David W. Laub
Attorney, Agent, or Firm—Foley & Lardner

[57] ABSTRACT

A toroidal type continuously variable transmission includes first and second parallel toroidal transmission units which are both mounted on a common center transmission shaft. The center transmission shaft is axially movable, and the input cone disc of each transmission unit is mounted on the center transmission shaft through ball splines in such a manner as to enable both the torque transmission and relative axial motion therebetween. Therefore, the center transmission shaft transmits, from the input disc of the first unit to the input disc of the second unit, not only an input torque inputted to the input disc of first unit through a loding cam mechanism, but also the an axial thrust load produced by the loading cam mechanism.

18 Claims, 1 Drawing Sheet

DUAL TOROIDAL CAVITY TYPE CONTINUOUSLY VARIABLE TRANSMISSION

REFERENCES TO RELATED U.S. APPLICATIONS

The following, commonly assigned, U.S. Patent Applications relate to subject matter similar to that of the present invention. (1) Ser. No. 7/313,418, filed Feb. 22, 1989. (2) Ser. No. 07/314,846; filed Feb. 24, 1989. (3) Ser. No. 07/316,944; filed Feb. 28, 1989. (4) Ser. No. 07/352,309; filed May 16, 1989. (5) Ser. No. 07/357,192; filed May 26, 1989. (6) Ser. No. 07/450,303; filed Dec. 14, 1989. (7) Ser. No. 07/448,194, filed Dec. 14, 1989. (8) Ser. No. 07/476,580, filed Dec. 414, 1989.

BACKGROUND OF THE INVENTION

The present invention relates to a toroidal type continuously variable transmission (CVT), and more specifically to a toroidal transmission having two toroidal cavities around a common axis (often called a dual cavity type).

Japanese Patent Provisional Publication No. 62-258255 discloses one conventional example. A toroidal transmission of this example has a first toroidal cavity formed between input and output discs of a first toroidal transmission unit, and a second toroidal cavity between input and output discs of a second unit. The first and second toroidal cavities are equal in size, coaxial with each other and axially spaced from each other. In this conventional example, the input discs of both units are mounted on a torque shaft, and drivingly connected with each other by the torque shaft. A loading cam mechanism for producing an axial thrust load in accordance with an input torque is provided at the side of the input disc of the first unit, and the thrust load is transmitted to the input disc of the second unit by an axially movable tension rod. The torque shaft is hollow, and the tension rod is arranged coaxially in the hollow torque shaft.

The dual cavity type toroidal transmission of this conventional example requires two separate coaxial shafts, the torque shaft and tension rod for transmission of torque and transmission of thust load. This conventional transmission design, therefore, increases the number of required component parts, requires an additional machining process for forming coaxial shafts, and complicates the assembly process with the result of cost increase.

A similar toroidal CVT is disclosed in Japanese Patent Provisional Publication No. 63-125852.

SUMMARY OF THE INVENTION

It is therefore an object of the present invention to provide a dual toroidal cavity type continuously variable transmission which requires only a single shaft for both torque transmission and thrust load transmission, and which can eliminate a phase difference in rotation between two toroidal transmission units.

According to the present invention, a toroidal type continuously variable transmission comprises a center transmission shaft, first and second outside discs, first and second inside discs, first and second rolling members, first loading means, and second loading means. The center transmission shaft is axially movable, and has first and second ends The first and second outside discs are mounted on and coupled with the center transmission shaft in such a manner as to permit the first and second outside discs to move axially relative to the center transmission shaft, and to prevent relative rotation between the center transmission shaft and each of the first and second outside discs. The first outside disc is near the first end of the center transmission shaft, and the second outside disc is near the second end. The first and the second inside discs are rotatably mounted on the center transmission shaft between the first and second outside discs. The first outside and inside discs form a first toroidal cavity therebetween, and the second outside and inside discs a second toroidal cavity. The first rolling member is installed in the first toroidal cavity, and serves as a medium for transmitting power from the first outside disc to the first inside disc or vice versa. The second rolling member is installed in the second toroidal cavity, and serves as a medium for transmitting power from the second outside disc to the second inside disc or vice versa. The first loading means is provided between the first outside disc and the center transmission shaft, and rotatably mounted on the center transmission shaft. The second loading means is provided between the second outside disc and the center transmission shaft. The first loading means is engaged with the center transmission shaft in such a manner that axial movement of said first loading means is limited by said center transmission shaft. The second loading means is also engaged with the center transmission shaft in such a manner that axial movement of the second loading means is the center transmission shaft.

DETAILED DESCRIPTION OF THE INVENTION

Figure 1:
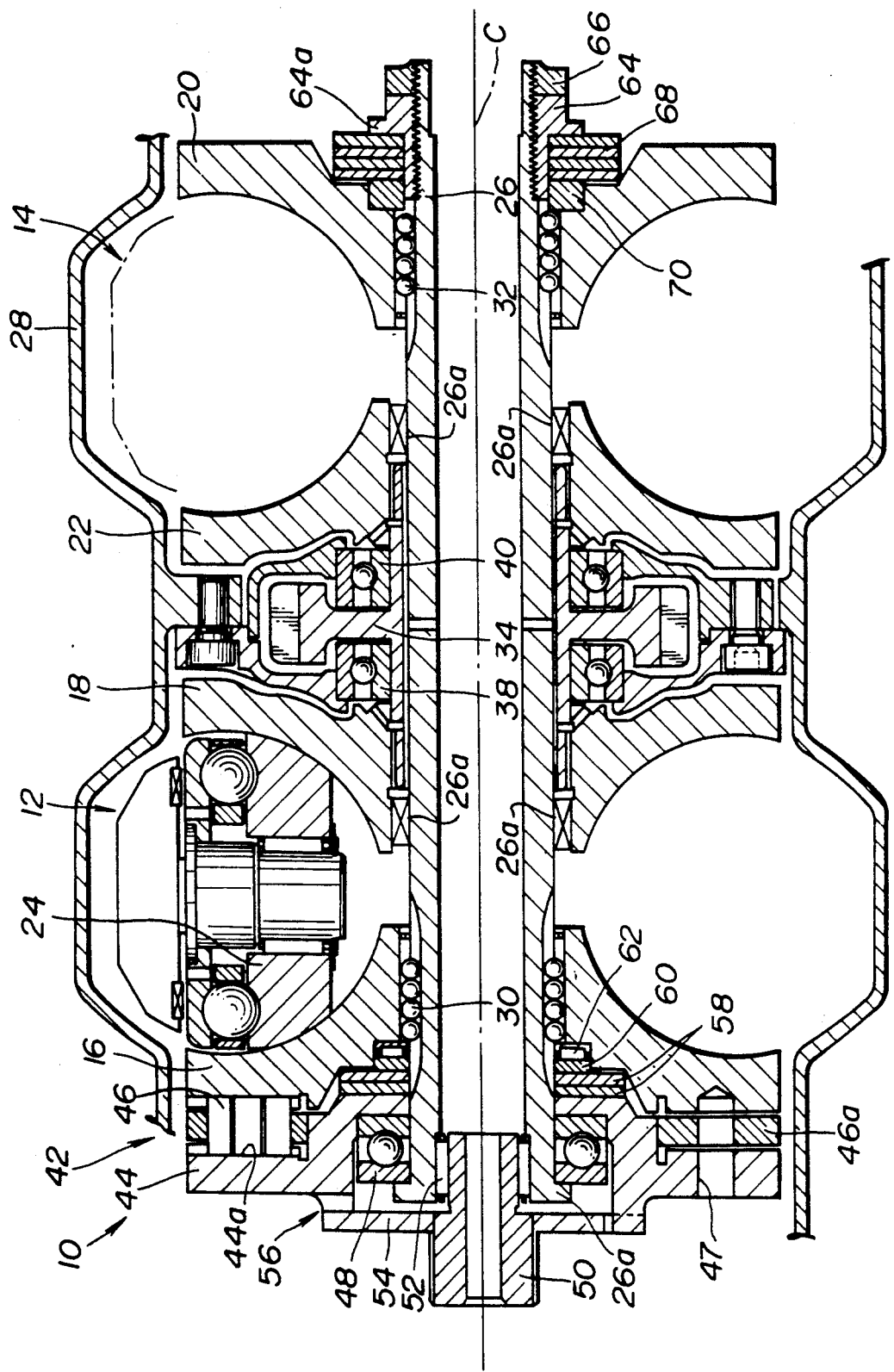
FIG. 1 is a sectional view of a toroidal type continuously variable transmission according to one embodiment of the invention.

FIG. 1 shows one embodiment of the present invention. A toroidal type continuously variable transmission (CVT) 10 of this embodiment includes a first toroidal transmission unit 12 and a second toroidal transmission unit 14, which are arranged side by side around a common axis C.

The first toroidal unit 12 has first input and output discs 16 and 18 which have opposite toroid surfaces confronting each other and forming a first toroidal cavity. Similarly, the second toroidal unit 14 has second input and output discs 20 and 22 forming a second toroidal cavity. Each toroidal unit has an intervening rolling member which comprises at least two power rollers 24 installed in the toroidal cavity. In each toroidal unit, the power rollers 24 are in frictional contact with the toroidal surfaces of the input and output discs 16 and 18 or 20 and 22. In this embodiment, each of the first and second toroidal units 12 and 14 has two power rollers 24 which are symmetrically arranged with respect to the axis C, as disclosed in the above-mentioned Japanese Patent Provisional Publication No. 62-258255.

The power rollers 24 are inclined by one or more control valves and actuators (not shown) in accordance with an operating condition such as a vehicle operating condition, as disclosed in Japanese Utility Model Provisional Publication No. 63-92859. In each toroidal unit, the power rollers 24 transmit power from the input disc to the output disc by rolling, and continuously vary a transmission ratio between output and input speeds by inclining. FIG. 1 shows only one power roller 24.

All the discs 16, 18, 20 and 22 are mounted on a single torque transmission center shaft 26. The axis of the center transmission shaft 26 is coincident with the above-mentioned common axis C. The center shaft 26 is hollow, and it is supported on a transmission housing 28 in such a manner that the center shaft 26 is axially movable, to a limited extent, with respect to the housing.

The center shaft 26 has a first end which is a lefthand end as viewed in FIG. 1 and a second right hand end. The first toroidal unit 12 is mounted on the first lefthand half of the center shaft 26 between the first end and the middle of the center shaft. The second toroidal unit 14 is mounted on the second righthand half of the center shaft 26 between the second end and the middle of the center shaft 26. Among the discs 16, 18, 20 and 22, the first input disc 16 is closest to the first lefthand end of the center shaft 26, and the second input disc 20 is the closest to the second righthand end of the center shaft 26. The first and second output discs 18 and 22 are disposed between the first and second input discs 16 and 20. Therefore, the input discs 16 and 20 of this embodiment are outside discs, and the output discs 18 and 22 are inside discs.

The outside first input disc 16 is mounted on the center shaft 26 through a first ball spline coupling 30 so that the first input disc 16 is not rotatable relative to the center shaft 26, but it is axially slidable relative to the center shaft 26. Similarly, the outside second input disc 20 is mounted on the center shaft 26 through a second ball spline coupling 32 so that the second input disc 20 is not rotatable relative to the center shaft 26 but it is axially slidable. The first and second input discs 16 and 20 are engaged with the center shaft 26 through the ball spline couplings 30 and 32, respectively, so that the first and second input discs 16 and 20 rotate together with the center shaft 26. The first and second input discs 16 and 20 are axially movable on the center shaft 26 to a limited extent. Each of the first and second ball spline couplings 30 and 32 is a coupling means for coupling coaxial shafts for power transmission therebetween. In this embodiment, each coupling means comprises splines and balls for making the relative axial motion between the shafts smooth. Thus, the first ball spline coupling 30 serves as a first coupling means, and the balls of the first coupling 30 are provided between the first outside disc 16 and the center transmission shaft 26, for facilitating the relative axial motion between the fist outside disc 16 and the center transmission shaft 26. The second ball spline coupling 32 serves as a second coupling mean, and the balls of the second coupling 32 are provided between the second outside disc 20 and the center transmission shaft 26, for facilitating the relative axial motion between the second outside disc 20 and the center transmission shaft 26.

An output gear (terminal member) 34 is rotatably mounted on the center shaft 26 through appropriate bearing means, 26a the first and second output discs 18 and 22 are splined to the output gear 34. Torque transmitted from the first input disc 16 to the first output disc 18, and torque transmitted from the second input disc 20 to the second output disc 22 are both transmitted to the output gear 34, and power is taken out through the output gear 34. The output gear 34 is rotatably supported by an inwardly projection portion of the housing 28 through ball bearings 38 and 40. The output gear 34 (second terminal member) is disposed between the first and second inside discs 18 and 22, and the inwardly projecting portion of the housing 28 projects inwardly toward the center transmission shaft 26 between the first and second inside discs 18 and 22, as shown in FIG. 1.

The toroidal transmission 10 further includes a loading cam mechanism 42 serving as a first loading means. The loading cam mechanism 42 is disposed next to the first input disc 16 around the first lefthand end of the center shaft 26. The loading cam mechanism 42 is designed to produce an axial pushing force (thrust load) in accordance with an input torque. The loading cam mechanism 42 has a loading cam disc 44 shaped like a flange, and loading rollers 46 which are confined between a cam surface 44a of the loading cam member 44 and an outside surface of the first input disc 16. The loading rollers 46 are supported by a support plate 46a disposed between the loading cam member 44 and the first input disc 16.

The loading cam member 44 is rotatably mounted on the center shaft 26 so that a relative rotation therebetween is possible, and engaged through a thrust bearing 48 with a flange 26a formed in the first lefthand end of the center shaft 26. A leftward pusing force applied on the loading cam member 44 is transmitted through the thrust bearing 48 and the flange 26a to the center shaft 26.

The loading cam mechanism 42 of this embodiment has at least one pin hole 47 which extends axially through the loading cam member 44, and the support plate 46a, into the first input disc 16. When the loading cam mechanism 42 is assembled, a knock pin (not shown) is inserted in the pin hole 47.

A torque input shaft 50 (terminal member) is rotatably received through a needle bearing 52 in the first lefthand end of the hollow center shaft 26. The input shaft 50 is coaxial with the center shaft 26. The input shaft 50 has a flange 54 which rotates with the input shaft 50 as a unit. The flange 54 is connected with the loading cam member 44 through a coupling means 56 shaped like splines.

A first disc spring 58 is disposed through a spacer 60 and a needle bearing 62 between the first input disc 16 and the loading cam member 44. The first disc spring 58 of this embodiment is a combination of Belleville springs (initially coned disc springs). A biasing force of the first disc spring 58 is parallel to the pushing force produced by the loading cam mechanism 42.

A second disc spring 68 for preloading is mounted on the second righthand end of the center transmission shaft 26. The second disc spring 68 is also a combination of Belleville springs, and serves as a second loading means. A loading nut 64 and a lock nut 66 are screwed firmly on the second right hand end of the center transmission shaft 26. The loading nut 64 prevents the first toroidal unit 12 and the second toroidal unit 14 from being axially extracted from the center shaft 26. The second disc spring 68 is disposed between a flange 64a of the loading nut 64 and the second input disc 20. A spacer 70 is interposed between the second input disc and the second disc spring 68. The second disc spring 68 applies a biasing force on the second input disc 20, and a reaction force due to this biasing force is applied through the loading nut 64 to the center transmission shaft 26.

The toroidal transmission 10 of this embodiment is operated as follows:

Torque from a prime mover such as an engine of a motor vehicle is first inputted to the torque input shaft 50. This input torque is transmitted from the input shaft 50 through the coupling means 56 to the loading cam member 44, so that the loading cam member 44 and the first input disc 16 rotate relative to each other. This relative rotation between the cam member 44 and the first input disc 16 causes the loading rollers 46 to be compressed between the loading cam member 44 and the first input disc 16 by the action of the cam mechanism 42. In this way, the loading rollers 46 are compressed between the cam member 44 and the first input disc 16, and the torque is transmitted from the cam member 44 to the first input disc 16. The force pressing the loading rollers 46 between the cam member 44 and the first input disc 16 is increased in proportion to the input torque, and this force acts also as a force (thrust load) pushing the first input disc 16 rightwardly toward the second end of the center transmission shaft 26.

The torque of the first input disc 16 is transmitted through the first ball spline coupling 30 to the center transmission shaft 26, and further transmitted from the center transmission shaft 26 through the second ball spline coupling 32 to the second input disc 20. The torque transmitted to the first input disc 16 is transmitted through the power rollers 24 to the first output disc 18. At the same time, the torque transmitted to the second input disc 20 is transmitted through the power rollers 24 to the second output diSc 22. In each Of the first and second toroidal units 12 and 14, power is transmitted from the input disc to the output disc through the power rollers 24 which are rolling about an inclinable axis.

The axial thrust force produced by the loading cam mechanism 42 pushes the first input disc 16 rightwardly toward the first output disc 18. At the same time, the reaction force of the this axial thrust force is transmitted through the thrust bearing 48 to the transmission shaft 26. Therefore, the transmission shaft 26 is axially moved, and applies a leftward axial force to the second input disc 20 through the loading nut 64 and the second disc spring 68.

In the toroidal transmission 10 of this embodiment, the single transmission shaft 26 alone is used for transmitting a torque between the first and second input discs 16 and 20, and transmitting a thrust load produced by the loading cam mechanism 42. The single transmission shaft 26 can perform the functions of both the torque shaft and tension rod of the conventional design. The toroidal transmission 10 of this embodiment can reduce the number of required component parts, simplify the structure, and facilitate the forming and assembly processes.

The first and second input discs 16 and 20 are engaged with the transmission shaft 26 through the ball splines 30 and 32 in such a manner that the first and second input discs 16 and 20 and the transmission shaft 26 all rotate together. Therefore, the toroidal transmission 10 of this embodiment can transmit torque efficiently with no phase difference in the rotational direction between the first and second input discs 16 and 20.

The ball splines 30 and 32 enable the first and second input discs 16 and 20 to move smoothly in the axial direction with respect to the transmission shaft 26, so that the thrust load of the loading cam mechanism 42 is transmitted smoothly.

In each of the toroidal units 12 and 14, the thrust load produced by the loading cam mechanism 42 acts to push the input disc 16 or 20 toward the output disc 18 or 22, and enables the power rollers 24 to transmit power without slippage.

The second disc spring 68 is interposed between the center transmission shaft 26 and the second input disc 20 which are so engaged by the ball spline coupling 32 as to prevent a relative rotation therebetween. Therefore, the second disc spring 68 rotates together with the center transmission shaft 26 and the second input disc 20, and the friction surfaces of these members are made immune from wear.

When the loading cam mechanism 42 is assembled, a knock pin is inserted in the pin hole 47 to effect an initial alignment of the loading cam mechanism 42, which helps prevention of the preload of the second disc spring 68 from being decreased when the loading cam mechanism 42 is displaced. The knock pin is extracted from the hole 47 after the assembly process.

In the toroidal transmission of this embodiment, torque is inputted to the outside discs 16 and 20, and taken out from the inside discs 18 and 22 through the output gear 34. However, the opposite arrangement is possible in which torque is inputted through the output gear 34 to the inside discs 18 and 22, and taken out from the outside discs 16 and 20.

What is claimed is:

1. A toroidal type continuously variable transmission comprising;

a center transmission shaft which is axially movable relative to a housing of said transmission, and which has first and second ends, first and second outside discs which are mounted on and coupled with said center transmission shaft in such a manner as to permit said first and second outside discs to move axially relative to said center transmission shaft, and to prevent relative rotation between said center transmission shaft and each of said first and second outside discs, said first outside disc being located near said first end of said center transmission shaft, and said second outside disc being located near said second end, first and second inside discs which are rotatably mounted on said center transmission shaft between said first and second outside discs, said first outside and inside discs forming a first toroidal cavity therebetween and said second outside and inside discs forming a second toroidal cavity therebetween, first and second rolling members, said first rolling member being installed in said first toroidal cavity for transmitting power between said first outside and inside discs, and said second rolling member being installed in said second toroidal cavity for transmitting power between said second outside and inside discs, first loading means provided between said first outside disc and said center transmission shaft, said first loading means being rotatably mounted on said center transmission shaft in such a manner as to permit relative rotation between said first loading means and said center transmission shaft, and second loading means provided between said second outside disc and said center transmission shaft.

2. A transmission according to claim 1 wherein said first loading means is provided between said first end of said center transmission shaft and said first outside disc so that said first loading means can apply a force acting in a first axial direction on said first outside disc, and simultaneously apply a force acting in a second axial direction opposite to said first axial direction, on said first end of said center transmission shaft, and said second loading means is provided between said second end of said center transmission shaft and said second outside disc so that said second loading means can apply a force acting in said second direction on said second outside disc and simultaneously apply a force in said first direction on said second end of said center transmission shaft.

3. A transmission according to claim 2 wherein said transmission further comprises a first terminal member drivingly connected with said first loading means so as to permit power transmission between said first terminal member and said first outside disc through said first loading means, and a second terminal member drivingly connected with said first and second inside discs so that power can be transmitted from said first terminal member to said second terminal member and vice versa through both said first and second rolling members.

4. A transmission according to claim 3 wherein said transmission further comprises first coupling means, provided between said first outside disc and said center transmission shaft, for permitting both transmission of rotation, and relative axial motion, between said first outside disc and said center transmission shaft, and second coupling means, provided between said second outside disc and said center transmission shaft, for permitting both transmission of rotation, and relative axial motion, between said second outside disc and said center transmission shaft.

5. A transmission according to claim 4 wherein said first loading means comprises a cam mechanism comprising a cam disc rotatably mounted on said center transmission shaft and disposed between said first end of said center transmission shaft and said first outside disc, and loading rollers, provided between said cam disc and said first outside disc, for applying an axial thrust load to said first outside disc in accordance with relative rotation between said cam disc and said first outside disc.

6. A transmission according to claim 5 wherein said second loading means comprises a disc spring.

7. A transmission according to claim 6 wherein said first coupling means comprises balls, provided between said first outside disc and said center transmission shaft, for facilitating the relative axial motion between said first outside disc and said center transmission shaft, and said second coupling means comprises balls, provided between said second outside disc and said center transmission shaft, for facilitating the relative axial motion between said second outside disc and said center transmission shaft.

8. A transmission according to claim 7 wherein said first terminal member comprises an input shaft engaged with said cam disc of said first loading means, and said second terminal member comprises an output gear rotatably mounted on said center transmission shaft.

9. A transmission according to claim 1 wherein said center transmission shaft comprises a first outward flange, and said first loading means is disposed between said first outward flange and said first outside disc in such a manner that said first loading means can cause said center transmission shaft to move axially relative to said housing of said transmission by applying an axial force on said first outward flange.

10. A transmission according to claim 9 wherein a thrust bearing is interposed between said first outward flange and said first loading means.

11. A transmission according to claim 10 wherein said center transmission shaft further comprises a second flange, and said second loading means is disposed between said second flange and said second outside disc.

12. A transmission according to claim 9 wherein said transmission further comprises a first terminal member which is drivingly connected with said first outside disc through said first loading means so that torque can be transmitted from said first terminal member through said first loading means to said first outside disc.

13. A transmission according to claim 12 wherein said first loading means comprises a cam mechanism comprising a cam disc rotatably mounted on said center transmission shaft and disposed between said first outward flange of said center transmission shaft and said first outside disc, and loading rollers, provided between said cam disc and said first outside disc, for applying an axial thrust load to said first outside disc in accordance with relative rotation between said cam disc and said first outside disc.

14. A transmission according to claim 12 wherein said transmission further comprises a second terminal member drivingly connected with said first and second inside discs so that torque can be transmitted between said first and second terminal members through both said first and second rolling members, said second terminal member being disposed between said first and second inside discs.

15. A transmission according to claim 14 wherein said second terminal member is rotatably supported by an inwardly projecting portion of said housing of said transmission, said inwardly projecting portion of said housing projecting inwardly toward said center transmission shaft between said first and second inside discs.

16. A transmission according to claim 1 wherein said transmission further comprises a first terminal member which is drivingly connected with said first outside disc through said first loading means so that torque can be transmitted from said first terminal member through said first loading means to said first outside disc.

17. A toroidal type continuously variable transmission comprising;
   a center transmission shaft which is axially movable relative to a housing of said transmission and which has first and second ends,
   first and second outside discs which are mounted on and coupled with said center transmission shaft in such a manner as to permit said first and second outside discs to move axially relative to said center transmission shaft, and to prevent relative rotation between said center transmission shaft and each of said first and second outside discs, said first outside disc being located near said first end of said center transmission shaft, and said second outside disc being located near said second end,
   first and second inside discs which are rotatably mounted on said center transmission shaft between said first and second outside discs, said first outside and inside discs forming a first toroidal cavity therebetween and said second outside and inside discs forming a second toroidal cavity therebetween,
   first and second rolling members, said first rolling member being installed in said first toroidal cavity for transmitting power between said first outside and inside discs, and said second rolling member being installed in said second toroidal cavity for transmitting power between said second outside and inside discs, first loading means rotatably mounted on said center transmission shaft and positioned between said first end of said center transmission shaft and said first outside disc so that said first loading means can apply a force acting in a first axial direction on said first outside disc, and simultaneously apply a force acting in a second axial direction opposite to said first axial direction, on said first end of said center transmission shaft, and said first loading means comprises a cam mechanism comprising a cam disc rotatably mounted on said center transmission shaft and disposed between said first end of said center transmission shaft and said first outside disc, and loading rollers, provided between said cam disc and said first outside disc, for applying an axial thrust load to said first outside disc in accordance with relative rotation between said cam disc and said first outside disc, second loading means provided between said second end of said center transmission shaft and said second outside disc so that said second loading means can apply a force acting in said second direction on said second outside disc and simultaneously apply a force in said first direction on said second end of said center transmission shaft, said second loading means comprising a disc spring, a first terminal member drivingly connected with said first loading means so as to permit power transmission between said first terminal member and said first outside disc through said first loading means, and a second terminal member drivingly connected with said first and second inside discs so that power can be transmitted from said first terminal member to said second terminal member and vice versa through both said first and second rolling members, first coupling means, provided between said first outside disc and said center transmission shaft, for permitting both transmission of rotation, and relative axial motion, between said first outside disc and said center transmission shaft, and second coupling means, provided between said second outside disc and said center transmission shaft, for permitting both transmission of rotation, and relative axial motion, between said second outside disc and said center transmission shaft, and wherein said center transmission shaft has a first outward flange formed in said first end, and a second flange formed in said second end.

18. A transmission according to claim 17 wherein a thrust bearing is interposed between said first outward flange of said center transmission shaft and said cam disc of said first loading means.

* * * * *